US006714240B1

(12) United States Patent
Caswell

(10) Patent No.: US 6,714,240 B1
(45) Date of Patent: Mar. 30, 2004

(54) OPTICAL SENSOR EMPLOYING MOTION COMPENSATED INTEGRATION-DEVICE AND PROCESS

(75) Inventor: Robert L. Caswell, Fullerton, CA (US)

(73) Assignee: Boeing North American, Inc., Seal Beach, CA (US)

( * ) Notice: Subject to any disclaimer, the term of this patent is extended or adjusted under 35 U.S.C. 154(b) by 0 days.

(21) Appl. No.: 09/339,053

(22) Filed: Jun. 23, 1999

Related U.S. Application Data

(60) Provisional application No. 60/090,320, filed on Jun. 23, 1998.

(51) Int. Cl.[7] .......................... H04N 5/217; H04N 7/18; H04N 5/225
(52) U.S. Cl. .................... 348/241; 348/144; 348/218.1
(58) Field of Search ................................ 348/142, 169, 348/218.1, 241, 242, 250, 291, 292, 144, 146, 147, 208.6

(56) References Cited

U.S. PATENT DOCUMENTS

| | | | | |
|---|---|---|---|---|
| 4,246,612 A | * | 1/1981 | Berry et al. ................. | 348/144 |
| 5,317,395 A | | 5/1994 | Carr et al. | |
| 5,341,142 A | | 8/1994 | Reis et al. | |
| 5,379,065 A | | 1/1995 | Cutts | |
| 5,400,161 A | | 3/1995 | Lambert, Jr. | |
| 5,424,742 A | | 6/1995 | Long et al. | |
| 5,430,445 A | | 7/1995 | Peregrim et al. | |
| 5,654,549 A | * | 8/1997 | Landecker et al. ......... | 250/332 |
| 5,798,786 A | * | 8/1998 | Lareau et al. ............... | 348/144 |
| 5,894,323 A | * | 4/1999 | Kain et al. ................... | 348/116 |
| 5,903,659 A | * | 5/1999 | Kilgore ....................... | 382/103 |
| 6,108,032 A | * | 8/2000 | Hoagland .................... | 348/144 |
| 6,130,705 A | * | 10/2000 | Lareau et al. ............... | 348/144 |
| 6,211,515 B1 | * | 4/2001 | Chen et al. ................. | 250/252.1 |
| 6,373,522 B2 | * | 4/2002 | Mathews et al. ........... | 348/144 |
| 6,486,911 B1 | * | 11/2002 | Denyer et al. .............. | 348/308 |
| 6,507,366 B1 | * | 1/2003 | Lee ............................. | 348/352 |

* cited by examiner

Primary Examiner—Wendy R. Garber
Assistant Examiner—Lin Ye
(74) Attorney, Agent, or Firm—Stout, Uxa, Buyan & Mullins, LLP; Donald E. Stout

(57) ABSTRACT

A motion compensated integration system and process for scanning a field and producing images of one or more densely filled wavebands has a moveable platform, an optical sensor, and optical sensor line-of-sight measuring device, and a processor. The optical sensor is mounted to the moveable platform and is made up of a telescope that is in functional relationship with a focal plane array. The focal plane array comprises one or more sets of detectors capable of receiving one or more wavebands and producing focal plane array data of the wavebands, respectively. The optical sensor line-of-sight measuring device is capable of producing optical sensor line-of-sight movement data. The processor is capable of receiving the focal plane array data and the optical sensor line-of-sight movement data and producing output images representing the wavebands, respectively. The system and process may normalize the data to account for border regions of the stabilized arrays. The focal plane array has a plurality of sets of detectors and the sets of detectors are intermingled to form a pattern. The pattern may be stripes, checkers, zigzags, or random. The moveable platform of the motion compensated integration system is a component of a missile, the telescope, a satellite, a space vehicle, an air vehicle, an aircraft, a ground vehicle, or a watercraft. As this invention provides inertially and electronically stabilized waveband arrays, the system and the process does not use scan mirrors, gimbals, or position pickoffs.

34 Claims, 3 Drawing Sheets

OPTICAL SENSOR EMPLOYING MOTION COMPENSATED INTEGRATION-DEVICE AND PROCESS

This application claims the benefit of U.S. Provisional Application No. 60/090,320 filed Jun. 23, 1998.

This invention was made with Government support under contract DASG60-90-C-0165 awarded by the U.S. Army. The Government has certain rights in this invention.

BACKGROUND OF THE INVENTION

The use of sensors to identify and track objects is well known in the prior art. Some sensors, such as radar systems, send out signals that reflect from objects and are received by the system. Other sensors, such as electro-optical sensors using telescopes and focal plane arrays, receive electromagnetic radiation signals from the objects themselves. Refining these sensors to be ever more accurate is ongoing development in this field.

One major area of development, especially in optical sensors using telescopes and focal plane arrays that detect infrared radiation, is the suppression of fixed pattern noise. The most common way disclosed in the prior art is to use calibration or non-uniformity correction. During calibration, the focal plane array receives radiation from a first uniform gray screen at one intensity and then from a second uniform gray screen of an another intensity. Based on the two sets of received data, a gain and a corresponding offset is determined for each detector in the focal plane array. Then, if the focal plane array does not change significantly, an inverse correction for the gain and the offset can be used to provide a useful degree of suppression of the fixed pattern noise. However, as time passes, the focal plane array does change and the calibration quality deteriorates. Further, the correction is only useful for operating conditions (intensity, spectral distribution, and focal plane array temperature) that remain reasonably close to those for which the calibration was performed. This method of fixed pattern suppression, particularly in a long wavelength infrared sensor, normally leaves a large residual fixed pattern which limits the sensor performance, often increasing the sensor noise level by an order of magnitude or more above the level that could otherwise be achieved.

Tracking objects using an optical sensor with telescope and focal plane array on a moving platform presents additional problems, including compensating for the movement of the moving platform and/or the target, also know as stabilization. The prior art discloses the use of position compensating devices, such as scan mirrors or gimbals equipped with servo drives and position pickoffs, to compensate for the movement of the platform. The position compensating devices receive input from reference gyros, either alone or contained within an inertial measurement unit ("IMU"), which comprises a triad of gyroscopes and a triad of accelerometers. From the gyro data, the position compensating devices mechanically stabilize the optical sensors to compensate for the movement of the platform. However, the position compensating devices are complicated (both mechanically and electrically), expensive, and their weight and volume is onerous.

The prior art also discloses using multiple focal plane arrays to detect electromagnetic radiation of different wavelengths. For example, two separate focal plane arrays have been used to detect a long wave infrared band and a short wave infrared band. In a typical arrangement, a dichroic beamsplinter is used to separate the two different wavelengths. For example, the dichroic reflects the short wave band to the short wave focal plane array while it transmits the long wave band energy to be received by the long wave band focal plane array. The use of two focal plane arrays—or more if multiple wavelength bands are desired—increases the complication, size, and expense of the system. Therefore, for moving platform applications, an optical sensor is needed that does not require mechanical stabilization, that has fixed pattern suppression, that does not require focal plane calibration and that does not limit the performance of the sensor, and has only one focal plane array but detects multiple wavelength bands.

SUMMARY OF THE INVENTION

In an aspect of the invention, a motion compensated integration system for scanning a field comprises a moveable platform, an optical sensor, and optical sensor line-of-sight measuring device, and a processor. The optical sensor is mounted to the moveable platform and comprises a telescope in functional relationship with a focal plane array. The focal plane array comprises one or more sets of detectors capable of receiving one or more wavebands and producing focal plane array data of the wavebands, respectively. The optical sensor line-of-sight measuring device is capable of producing optical sensor line-of-sight movement data. The processor is capable of receiving the focal plane array data and the optical sensor line-of-sight movement data and producing output images representing the wavebands, respectively.

In a further aspect of the invention, the focal plane array comprises a plurality of sets of detectors and the sets of detectors are intermingled to form a pattern. In still further aspects of the invention, the pattern may be stripes, checkers, zigzags, or random. In an additional aspect of the invention there are two sets of detectors and the pattern is alternating stripes.

In a further aspect of the invention, the processor is enabled to perform the steps of:

a. receiving repeated scans of the field from the focal plane array resulting in scanning data for each detector;

b. generating a subframe array from the scanning data for each waveband for each scan performed, resulting in a total number of subframe arrays;

c. generating offset movement data of the focal plane array corresponding to an approximated line-of-sight for each subframe array;

d. integrating the subframe arrays into a stabilized waveband array for each waveband using the offset movement data, wherein the stabilized waveband array is comprised of elements;

e. estimating a fixed pattern for each detector by integrating the scanning data for each detector and dividing the integrated scanning data by the total number of subframe arrays;

f. suppressing the fixed pattern for each detector from the stabilized waveband arrays by deducting from each stabilized waveband array element the fixed pattern for each detector for each incidence that the detector contributed to each stabilized waveband array element, thereby generating fixed pattern suppressed stabilized waveband arrays for each waveband; and g. outputting the fixed pattern suppressed stabilized waveband arrays as the output images.

In a still further aspect of the invention, the processor comprises machine readable instructions for directing the process to perform the steps a through g listed directly above. In another aspect of the invention, the processor comprises hardwired devices for performing at least a portion of the steps a through g listed directly above.

In a further aspect of the invention, the stabilized waveband arrays are inertially stabilized.

In a further aspect of the invention, the fixed pattern suppressed stabilized waveband arrays are comprised of elements that were contributed to by a contribution number of subframe arrays, respectively. Further, the processor is enabled to perform the further step of normalizing the fixed pattern suppressed stabilized waveband arrays by dividing each fixed pattern suppressed stabilized waveband array element by a respective contribution number.

In a further aspect of the invention, the focal plan array and the processor are designed to scan at 4000 Hz and produce output images at 10 Hz.

In aspects of the invention, the optical sensor is mounted to the moveable platform in any suitable fashion. In an aspect of the invention, the optical sensor is fixedly mounted to the moveable platform. In another aspect of the invention, the optical sensor is movedly mounted to the platform such that a line-of-sight of the optical sensor may be changed relative to the moveable platform.

In aspects of the invention, the moveable platform of the motion compensated integration system is a component of a missile, the telescope, a satellite, a space vehicle, an air vehicle, an aircraft, a ground vehicle, or a watercraft.

In an aspect of the invention, an attitude control system is functionally connected to the moveable platform for maintaining an angular position of the moveable platform with predetermined limits of roll, pitch, and yaw. In a still further aspect of the invention, the processor comprises means for directing the attitude control system to maintain movement of the moveable platform within a predetermined angular velocity range.

In an aspect of the invention, the optical sensor line-of-sight measuring device comprises an inertial reference unit mounted to the moveable platform. The inertial reference unit is capable of producing the optical sensor line-of-sight movement data and the processor is capable of receiving the optical sensor line-of-sight movement data. In an aspect of the invention, the inertial reference unit comprises one or more gyroscopes.

In an aspect of the invention, the system does not comprise scan mirrors, gimbals, or position pickoffs.

In an aspect of the invention, a process creates a plurality of output images of a field representing one or more wavebands. The process has a first step of providing an optical sensor mounted to a moveable platform, the optical sensor comprising a telescope in functional relationship with a focal plane array, the focal plane array comprising one or more sets of detectors capable of receiving the wavebands and producing focal plane array data of the wavebands, respectively. Next, the field is repeatedly scanned by the focal plane array resulting in scanning data for each detector. Further, a subframe array is generated from the scanning data for each waveband for each scan performed, resulting in a total number of subframe arrays. Also, offset movement data of the focal plane array is generated that corresponds to an approximated line-of-sight for each subframe array. The subframe arrays are integrated into a stabilized waveband array for each waveband using the offset movement data. A fixed pattern for each detector is estimated by integrating the scanning data for each detector and dividing the integrated scanning data by the total number of subframe arrays. The fixed pattern for each detector is suppressed from the stabilized waveband arrays by deducting from each stabilized waveband array element the fixed pattern for each detector for each incidence that the detector contributed to each stabilized waveband array element, thereby generating fixed pattern suppressed stabilized waveband arrays for each waveband. The fixed pattern suppressed stabilized waveband arrays are outputted as the output images.

In a further aspect of the invention, the focal plane array comprises a plurality of sets of detectors and the sets of detectors are intermingled to form a pattern. In a still further aspect of the invention, the pattern is stripes, checkers, zigzags, or random. In an additional aspect of the invention, there are two sets of detectors and the pattern is alternating stripes.

In a further aspect of the invention, the stabilized waveband arrays are inertially stabilized.

A further aspect of the invention comprises the step of normalizing the fixed pattern suppressed stabilized waveband arrays by dividing each fixed pattern suppressed stabilized waveband array element by a respective contribution number, wherein the respective contribution numbers are an amount of incidences that each fixed pattern suppressed stabilized waveband array element was contributed to by the subframe arrays.

In a further aspect of the invention, the repeatedly scanning step is performed 400 times at 4000 Hz.

In a further aspect of the invention, the optical sensor is maintained within predetermined limits of roll, pitch, and yaw. This may be preformed by an attitude control system that is functionally connected to the moveable platform.

In an aspect of the invention, the optical sensor is maintained within a predetermined angular velocity range. This may be preformed by an attitude control system that is functionally connected to the moveable platform.

In an aspect of the invention, the line-of-sight of the optical sensor may be changed relative to the moveable platform.

In an aspect of the invention, the moveable platform is a missile, the telescope, a satellite, a space vehicle, an air vehicle, an aircraft, a ground vehicle, or a watercraft.

In an aspect of the invention, the generating offset movement data step is at least partially performed by an optical sensor line-of-sight measuring device that is functionally connected to the moveable platform.

In an aspect of the invention, the generating offset movement data step is at least partially performed by an inertial reference unit functionally connected to the moveable platform.

In an aspect of the invention, the inertial reference unit comprises one or more gyroscopes.

In an aspect of the invention, the process is not performed using scan mirrors, gimbals, or position pickoffs.

An aspect of the invention involves a process for manufacturing a focal plane array for an optical sensor comprising the steps of providing a plurality of sets of detectors, wherein each set of detectors detects a different waveband and constructing the focal plane array using the plurality of sets of detectors such that the sets of detectors are intermingled in the focal plane array in a pattern.

In an aspect of the invention, the constructing step further comprises the step of arranging the plurality of sets of detectors in alternating stripes. In a still further aspect of the invention, there are two sets of detectors.

In an aspect of the invention, the constructing step further comprises the step of arranging the plurality of sets of detectors in a checkered, zigzag or random pattern.

BRIEF DESCRIPTION-OF THE DRAWINGS

DETAILED DESCRIPTION OF EMBODIMENTS OF THE INVENTION

Figure 1:
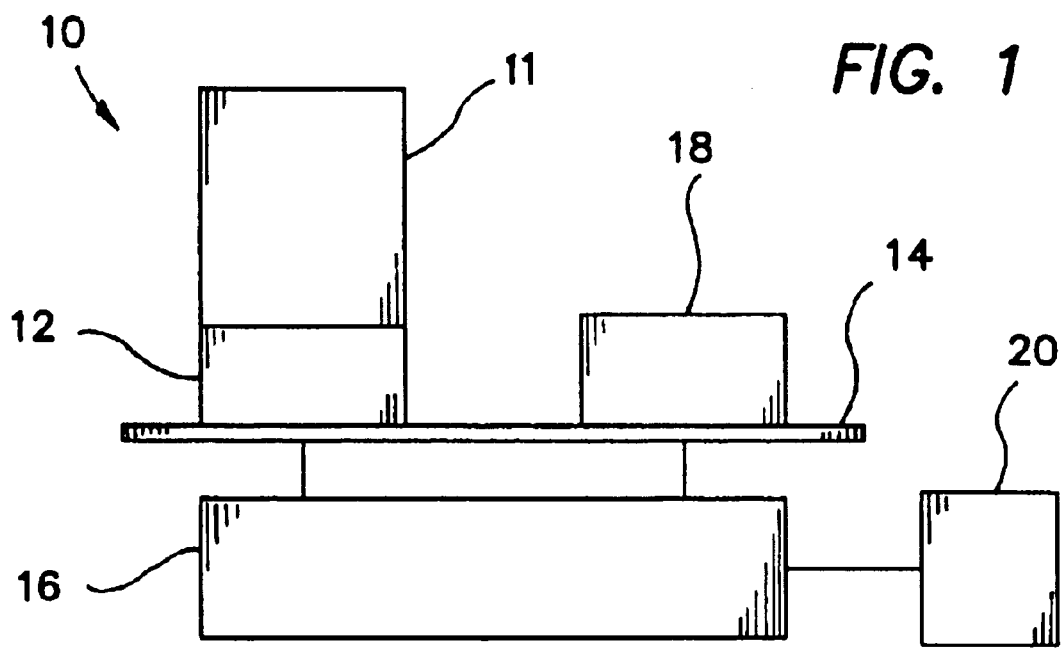
FIG. 1 shows a schematic representation of a motion compensated integration system according to an embodiment of the invention.

Referring to FIG. 1, a motion compensated integration system 10, according to an embodiment of the invention, comprises an optical sensor using a telescope 11 and focal plane array ("FPA") 12 fixedly mounted to a moving platform 14. In an embodiment of the invention, the moving platform 14 is an interceptor missile that operates in outer space. Other embodiments of the invention may have other applications, such as satellites, space vehicles, air vehicles, aircraft, ground vehicles, and watercraft.

Data received by FPA 12 is directed to a motion compensated integration ("MCI") processor 16. Also mounted on the moving platform 14 is an inertial measurement unit ("IMU") 18, which sends optical sensor line-of-sight movement data from a triad of gyroscopes (not shown) to the MCI processor 16. By the telescope 11 and FPA 12 being fixedly mounted to the moving platform 14, the shown embodiment of the invention does not comprise position compensating devices, such as scan mirrors, gimbals, and position pickoffs, but rather uses data from the IMU 18 to compensate for the movement of the platform 14. Other embodiments of the invention may use an optical sensor line-of-sight measuring device (not shown) capable of producing the optical sensor line-of-sight movement data. In still further embodiments of the invention, the optical sensor line-of-sight measuring device may incorporate an inertial measurement unit.

Other embodiments of the invention may have the telescope 11 itself functioning as the moving platform. Still further embodiments of the invention may have the FPA 12 moveably mounted to the moving platform 14 such that the orientation of the FPA 12 relative to the moving platform may change prior to scanning. These embodiments of the invention result in the line-of-sight of the optical sensor being changeable relative to the platform 14. The FPA 12 is fixedly positioned to the moving platform 14 once scanning begins.

Figure 2:
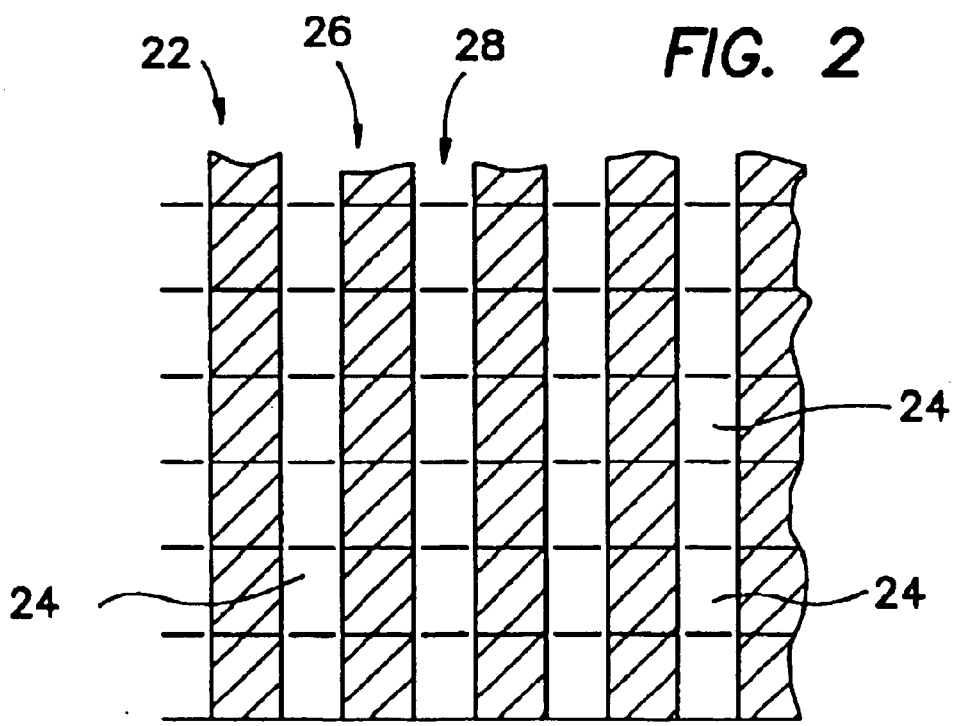
FIG. 2 shows a segment of a focal plane array of the motion compensation integration system of FIG. 1 with a pattern of high and low waveband sets of detectors arranged in stripes.

Referring now to FIG. 2, an FPA segment 22 is shown according to an embodiment of the invention. The FPA segment 22 is made up of a physical array of detectors 24. The detectors 24 are arranged in alternating vertical rows of short band detectors 26, represented as darkened, and long band detectors 28. In other words, a set of short band detectors and a set of long band detectors are arranged in an alternating striped pattern in the FPA 12. The shown embodiment of the invention detects only infrared short and long band wavelengths. Other embodiments of the invention may have other detector arrangements and may detect other wavelengths, as described below.

Figure 3:
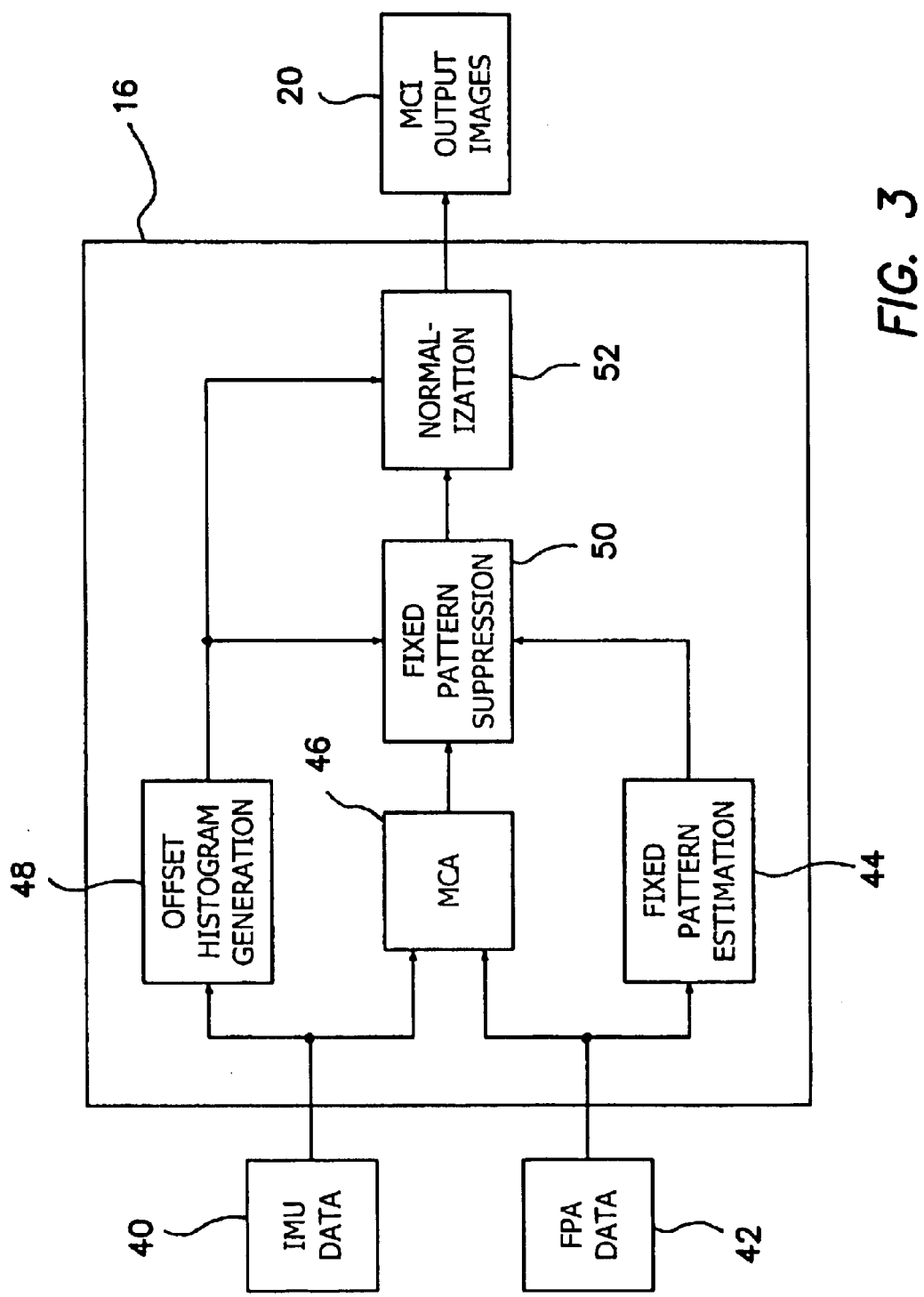
FIG. 3 shows a process flow diagram for analyzing data generated by the motion compensated integration system of FIG. 1 to produce images of the field of view.

The MCI processor 16 processes the data from the FPA 12 and the IMU 18 to produce an MCI output image 20 for each waveband (two images in this example; a long band image and a short band image). Referring now to FIG. 3, IMU data 40 and FPA data 42 are received by the MCI processor 16. The FPA data 42 is processed in a fixed pattern estimation step 44 and a motion compensated accumulation ("MCA") step 46. The IMU data 40 is also used by the MCA step 46 and in an offset histogram generation step 48. The results of the fixed pattern estimation step 44, the MCA step 46, and the offset histogram generation step 48 are used in a fixed pattern suppression step 50 to remove the fixed pattern noise present in the FPA data 42 from the output of the MCA step 46. The results of the offset histogram generation step 48 are used again in the normalization step 52 to further refine the data that becomes the MCI output images 20.

Integrating the IMU data 22 into the various steps performed by the MCI 16 is the key to eliminating the position compensating devices, such as scan mirrors, gimbals, and position pickoffs, by electronically compensating for the movement of the platform 14 and by using the movement of the platform as scanning motion for the sensor. As the FPA 12 is mounted, either fixedly or positionably, prior to scanning, on the moving platform 14, the FPA 12 moves as the platform 14 moves in angular space during scanning. The angular movement of the platform 14 is controlled by an attitude control system ("ACS") (not shown). The ACS maintains the angular position of the platform 14 within predefined limits of roll, pitch, and yaw simultaneously. Maintaining this attitude control in the most economical manner, however, allows limited cycle motion between the roll, pitch, and yaw limits, and, typically, results in continuous motion. The continuous motion of the FPA 12, as it moves with the moving platform 14 during scanning, results in the FPA 12 receiving wavelengths from different positions in two-dimensional space.

The IMU data 40 is used in a number of the steps performed by the MCI processor 16 to process the FPA data 42 using the incidental motion of the platform (in this case, the limit cycle motion) for scanning to produce highly effective fixed pattern noise suppression, and to produce dense (filled) output images for each color from the sparsely sampled part of the FPA 12 that is dedicated to each color.

One of the ways that the IMU data 12 is used by the MCI processor 16 is in the motion compensation accumulation (MCA) step 46. During step 46, the FPA data 42 is integrated in a set of inertially stabilized arrays, with an array for each color band. Another way to view this step is that the FPA data 42 for each color is electronically stabilized. To accomplish the MCA step 46, the portion of each subframe of data taken with detectors sensitive to a given color band is added to that color band's inertially stabilized array.

The MCA step 46 inertially stabilizes the FPA data 42 for each color band by adding each subframe at an offset (x, y) corresponding to its inertial viewing angle. The inertial viewing angle information of the optical sensor line-of-sight is determined, using methods known to those skilled in the art, from the gyro component of the IMU data 40. Other embodiments of the invention may use other means for providing data of line-of-sight movement of the FPA 12 and the optical sensor. For a dual band FPA, such as an FPA comprising the FPA segment 22 shown in FIG. 2, each subframe from the short band detectors 26 is added to a short band inertially stabilized array, while each subframe from the long band detectors 28 is placed in a long band inertially stabilized array. Given sufficient scan motion normal to the filter stripes as described below, this process provides a color-filled master frame for each band. This is a result of the scanning motion of the FPA 12 providing data for each element of the inertially stabilized arrays over the 400 subframes that are used in each master frame.

Since the FPA segment 22 of FIG. 2 has the detectors 24 arranged in vertical stripes 26 and 28, it is required that some scanning of the field of view take place normal to the stripes. If the entire scanning motion during a master frame is in a vertical direction, the inertially stabilized arrays would have blank vertical stripes as the short band detectors 24 would not receive signals from the field of view of the long band detectors, and vice versa. In an embodiment of the invention, the ACS may be directed to fire to achieve higher horizontal angular velocity if the horizontal angular velocity is inadequate to move the FPA array 12 to accumulate data to fill the inertially stabilized color arrays. Alternatively, no images or lower quality images may be accepted for such master frames.

While FPA segment 22 of FIG. 2 is a dual band array for two wavelength bands, other embodiments of the invention for may have other arrangements. An embodiment of the invention may be a single band FPA, thus eliminating the need for color filling. Another embodiment of the invention may detect more than two bands, thus requiring the FPA detectors 24 to be appropriately intermingled to re-register the plurality of bands. The intermingling of the different sets of waveband detectors may be accomplished with sequentially alternating vertical stripes, which is analogous to the shown FPA array 22. However, other intermingling patterns may also be employed, such as zigzag patterns, checkered patterns, or random patterns for example.

The MCA step 46 results in a short band inertially stabilized array and a long band inertially stabilized array for the dual band FPA 12. Each element in the arrays comprises data corresponding to its inertial viewing angle. For the shown embodiment of the invention, the data comprises data concerning the infrared environment for a given field of view in two dimensional inertial space and noise, including fixed pattern noise and background noise. The background noise is partially suppressed as a result of the integration of the 4000 Hz images from the FPA array 12 to the 10 Hz images of the MCA output images 20. The fixed pattern noise is smoothed to some extent as a result of the varying offset positions at which the data has been accumulated. These varying offset positions result in a number of different detectors 24 contributing to each inertially stabilized array value, so that the fixed pattern of each inertially stabilized array value is the weighted mean of the fixed patterns of each of the detectors that contributed to it. This smoothing does not constitute adequate suppression of fixed pattern; that will be performed in a subsequent step.

During the offset histogram step 48, the MCI processor 16 generates a histogram for a master frame of the complete sequence of offsets used in the MCA step 46 as a result of the movement of the platform 14 and, therefore, the FPA 12, based on the measurement of platform movement by the IMU 18. In an embodiment of the invention, the FPA data 42 are output images generated at 4000 Hz. However, the MCI output image 20 is at 10 Hz. A master frame is made up of 400 subframe images or arrays of the FPA 42 output. The 400 subframes are integrated to make up the one master frame, resulting in 10 master frames per second being output as the MCA output images 20. Other embodiments of the invention may have different input or output speeds and different numbers of subframes per master frame. The histogram, and other computational arrays described herein, accumulate data for each master frame. At the beginning of each master frame, the computational arrays are cleared.

Figure 4:
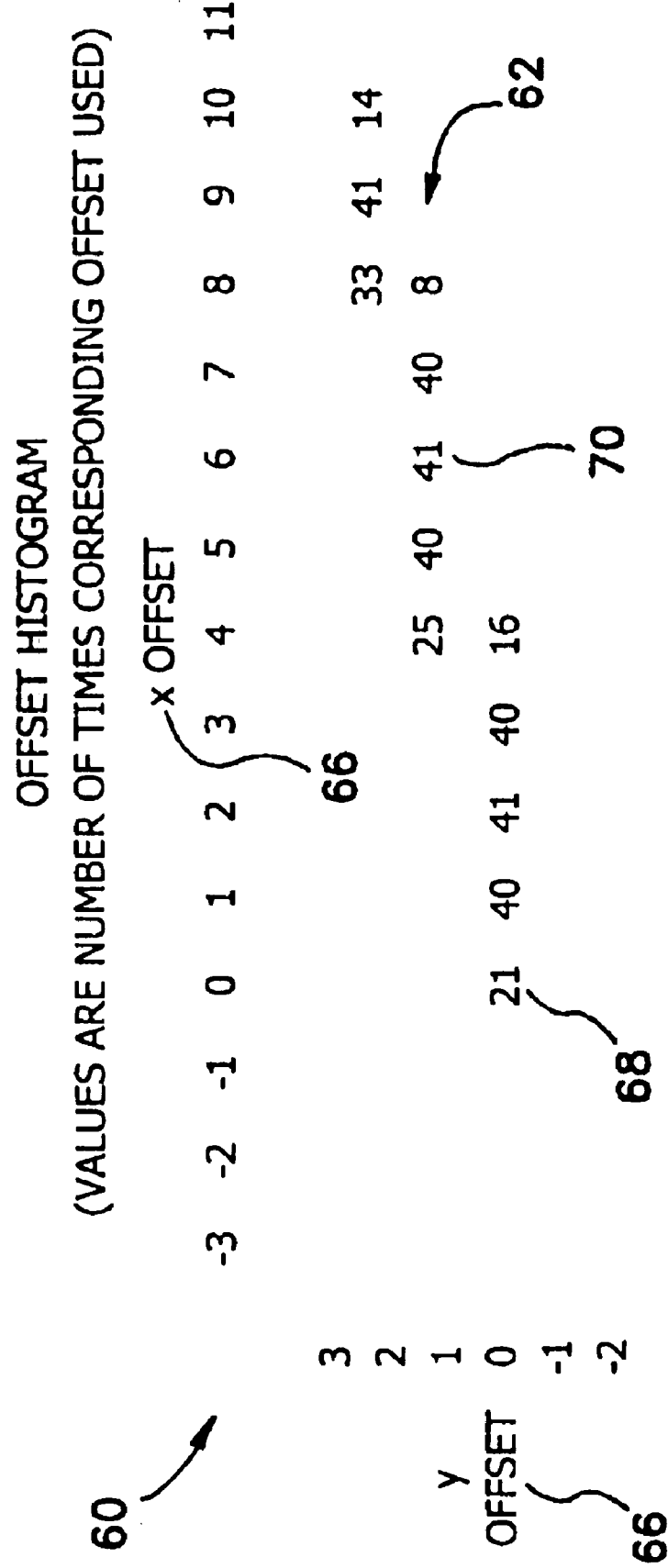
FIG. 4 shows a graphic representation of an offset histogram representing the changing optical sensor line-of-sight information generated by the motion compensated integration system of FIG. 1.

Referring now to FIG. 4, a visual representation of an example of a histogram 60 generated during the offset histogram step 48 is an array 62 defined by an x offset 64 and a y offset 66. In physical terms, one unit of offset is the angular distance the telescope 11 and FPA 12 must move to shift the image by a distance on the FPA corresponding to a detector 24 field of view. In the offset histogram example 62, the (0,0) offset 68 was used 21 times, while the (6,1) offset 70 was used 41 times. Overall, the 400 subframes used 13 offsets in the example.

In the fixed pattern estimation step 44, the FPA data 42 for each detector 24 is separately integrated. The resulting value for each detector 24 is divided by the number of subframes integrated (400 in this example) to provide a contemporaneous estimate of the mean fixed pattern noise per subframe by detector. The fixed pattern estimation step 44, along with the fixed pattern suppression step 50, replaces the calibration or non-uniformity correction performed in the prior art, thus eliminating the gray scene calibration process, inherent inaccuracies in the process, and removing inaccuracies in the calibration due to age. In the fixed pattern estimation step 26, there is no compensation for movement of the telescope 11 and FPA 12.

The fixed pattern suppression step 50 removes the estimated fixed pattern noise from the inertially stabilized arrays generated in the MCA step 46. This step is performed using data from the offset histogram generation step 48 and the fixed pattern estimation step 44. The fixed pattern estimation step 44 results in a computation array comprising a mean fixed pattern estimate for each detector 24. The offset histogram generating step 48 results in a computation array representing the number of times a corresponding offset was used. From this information, the estimated contribution from each detector 24 to the fixed pattern noise may be determined for each inertially stabilized array element.

The estimated contribution of the fixed pattern noise is removed by deducting from each inertially stabilized element the mean fixed pattern value for a specific detector 24 for each time the specific detector had data inputted into the inertially stabilized element. For example, if element (0,0) which has a value of X, had 250 A values from a detector A, 50 B values from a detector B, and 100 C values from a detector C, the fixed pattern suppression value of element (0,0) is X−250(A)−50(B) −100(C). When this is completed for each inertially stabilized element, the inertially stabilized image is reduced to virtually zero. If there were no objects radiating in the detector band in the two dimensional space corresponding to a specific inertially stabilized element, the post suppression value would be just background noise theoretically. However, the value relating to an object in the two dimension space would be retained in the element. The result of this process, which may be accomplished using any suitable mathematical technique, is that the magnitude of each inertially stabilized element is the mean change in output for the group of detectors that contributed to the element. This also inherently compensates for a portion of the background noise.

The post fixed pattern suppression inertially stabilized array is then normalized in step 52. The overall invention does not control the number of samples contributing to different elements in the MCA image array. This is because the angular movement of the FPA array is not essentially controlled, but the processing is adaptive to the scan that occurs. Since the sampling can have differences that may distort the inertially stabilized array, the array values should be normalized. An array value is normalized by dividing the value by the number of subframe samples that contributed to it. Embodiments of the invention may not utilize the normalization step. Embodiment of the invention comprising a single waveband FPA may not normalize an inertially stabilized array that is densely sampled. However, normalization may occur in single waveband embodiment of the invention when the processing is extended into the edge zone of the inertially stabilized array, where differing numbers of subframes contribute to the array values.

While the description above refers to particular embodiments of the present invention, it will be understood that many modifications may be made without departing from the spirit thereof. For example, embodiments of the invention may detect wavelengths other than infrared, and fixed pattern suppression can be accomplished by temporally filtering the FPA data. Additionally, embodiments of the invention may include any randomly, or predictably, moving platform to fixedly mount the telescope and FPA array onto. Further, the telescope may be the moving platform in some embodiments of the invention. Further, the location of the MCI processor relative to the FPA array or the moving platform is not a limitation of the invention. Further, aspects of the invention may have combinations of the above described embodiments although these combinations may not be explicitly described. The accompanying claims are intended to cover such embodiments as would fall within the true scope and spirit of the present invention.

What is claimed is:

1. A motion compensated integration system for scanning a field comprising:
   a. a moveable platform;
   b. an optical sensor mounted to the moveable platform, the optical sensor comprising a telescope in functional relationship with a focal plane array, the focal plane array comprising one or more sets of detectors capable of receiving one or more wavebands and producing focal plane array data of the wavebands, respectively;
   c. an optical sensor line-of-sight measuring device capable of producing optical sensor line-of-sight movement data; and
   d. a processor capable of receiving the focal plane array data and the optical sensor line-of-sight movement data and producing output images representing the wavebands, respectively, wherein the processor is enabled to perform the steps of:
      1. receiving repeated scans of the field from the focal plane array resulting in scanning data for each detector;
      2. generating a subframe array from the scanning data for each waveband for each scan performed, resulting in a total number of subframe arrays;
      3. generating offset movement data of the focal plane array corresponding to an approximated line-of-sight for each subframe array;
      4. integrating the subframe arrays into a stabilized waveband array for each waveband using the offset movement data, wherein the stabilized waveband array is comprised of elements;
      5. estimating a fixed pattern for each detector by integrating the scanning data for each detector and dividing the integrated scanning data by the total number of subframe arrays;
      6. suppressing the fixed pattern for each detector from the stabilized waveband arrays by deducting from each stabilized waveband array element the fixed pattern for each detector for each incidence that the detector contributed to each stabilized waveband array element, thereby generating fixed pattern suppressed stabilized waveband arrays for each waveband; and
      7. outputting the fixed pattern suppressed stabilized waveband arrays as the output images.

2. The system of claim 1, wherein:
   a. the focal plane array comprises a plurality of sets of detectors; and
   b. the sets of detectors are intermingled to form a pattern.

3. The system of claim 2, wherein the pattern is stripes, checkers, zigzags, or random.

4. The system of claim 2, wherein:
   a. there are two sets of detectors; and
   b. the pattern is alternating stripes.

5. The system of claim 1, wherein the processor comprises machine readable instructions for directing the processor to perform the recited steps.

6. The system of claim 1, wherein the processor comprises hardwired devices for performing at least a portion of the recited steps.

7. The system of claim 1, wherein the stabilized waveband arrays are inertially stabilized.

8. The system of claim 1, wherein:
   a. the fixed pattern suppressed stabilized waveband arrays are comprised of elements that were contributed to by a contribution number of subframe arrays, respectively; and
   b. the processor is enabled to perform the further step of normalizing the fixed pattern suppressed stabilized waveband arrays by dividing each fixed pattern suppressed stabilized waveband array element by a respective contribution number.

9. The system of claim 1, wherein the focal plan array and the processor are designed to scan at 4000 Hz and produce output images at 10 Hz.

10. The system of claim 1, wherein the optical sensor is fixedly mounted to the moveable platform.

11. The system of claim 1, wherein the optical sensor is movedly mounted to the platform such that a line-of-sight of the optical sensor may be changed relative to the moveable platform.

12. The system of claim 1, wherein the moveable platform is a missile, a telescope, a satellite, a space vehicle, an air vehicle, an aircraft, a ground vehicle, or a watercraft.

13. The system of claim 1, further comprising an attitude control system that is functionally connected to the moveable platform for maintaining an angular position of the moveable platform with predetermined limits of roll, pitch, and yaw.

14. The system of claim 13, wherein the processor comprises means for directing the attitude control system to maintain movement of the moveable platform within a predetermined angular velocity range.

15. The system of claim 1, wherein the optical sensor line-of-sight measuring device comprises an inertial reference unit mounted to the moveable platform, wherein the inertial reference unit is capable of producing the optical sensor line-of-sight movement data and the processor is capable of receiving the optical sensor line-of-sight movement data.

16. The system of claim 15, wherein the inertial reference unit comprises one or more gyroscopes.

17. The system of claim 1, wherein the system does not comprise scan mirrors, gimbals, or position pickoffs.

18. A process for creating a plurality of output images of a field representing one or more wavebands comprising the steps of:
   a. providing an optical sensor mounted to a moveable platform, the optical sensor comprising a telescope in functional relationship with a focal plane array, the focal plane array comprising one or more sets of detectors capable of receiving the wavebands and producing focal plane array data of the wavebands, respectively;

b. repeatedly scanning the field from the focal plane array resulting in scanning data for each detector;

c. generating a subframe array from the scanning data for each waveband for each scan performed, resulting in a total number of subframe arrays;

d. generating offset movement data of the focal plane array corresponding to an approximated line-of-sight for each subframe array;

e. integrating the subframe arrays into a stabilized waveband array for each waveband using the offset movement data, wherein the stabilized waveband array is comprised of elements;

f. estimating a fixed pattern for each detector by integrating the scanning data for each detector and dividing the integrated scanning data by the total number of subframe arrays;

g. suppressing the fixed pattern for each detector from the stabilized waveband arrays by deducting from each stabilized waveband array element the fixed pattern for each detector for each incidence that the detector contributed to each stabilized waveband array element, thereby generating fixed pattern suppressed stabilized waveband arrays for each waveband; and h. outputting the fixed pattern suppressed stabilized waveband arrays as the output images.

19. The process of claim 18, wherein:

a. the focal plane array comprises a plurality of sets of detectors; and b. the sets of detectors are intermingled to form a pattern.

20. The process of claim 19, wherein the pattern is stripes, checkers, zigzags, or random.

21. The process of claim 19, wherein:

a. there are two sets of detectors; and b. the pattern is alternating stripes.

22. The process of claim 18, wherein the stabilized waveband arrays are inertially stabilized.

23. The process of claim 18, further comprising the stop of normalizing the fixed pattern suppressed stabilized waveband arrays by dividing each fixed pattern suppressed stabilized waveband array element by a respective contribution number, wherein the respective contribution numbers are an amount of incidences that each fixed pattern suppressed stabilized waveband array element was contributed to by the subframe arrays.

24. The process of claim 18, wherein the repeatedly scanning step is performed 400 times at 4000 Hz.

25. The process of claim 18, further comprising the step of maintaining the optical sensor within predetermined limits of roll, pitch, and yaw.

26. The process of claim 25, wherein the maintaining step is at least partially performed by an attitude control system that is functionally connected to the moveable platform.

27. The process of claim 18, further comprising the step of maintaining the optical sensor within a predetermined angular velocity range.

28. The process of claim 27, wherein the maintaining step is at least partially performed by an attitude control system that is fractionally connected to the moveable platform.

29. The process of claim 18, further comprising the step of changing a line-of-sight of the optical sensor relative to the moveably platform.

30. The process of claim 18, wherein the moveable platform is a missile, a telescope, a satellite, a space vehicle, an air vehicle, an aircraft, a ground vehicle, or a watercraft.

31. The process of claim 18, wherein the generating offset movement data step is at least partially performed by an optical sensor line-of-sight measuring device that is functionally connected to the moveable platform.

32. The process of claim 18, wherein the generating offset movement data step is at least partially performed by an inertial reference unit functionally connected to the moveable platform.

33. The process of claim 32, wherein the inertial reference unit comprises one or more gyroscopes.

34. The process of claim 18, wherein steps of the process are not performed using scan mirrors, gimbals, or position pickoffs.

* * * * *